US011695143B2

(12) United States Patent
Matsusue

(10) Patent No.: US 11,695,143 B2
(45) Date of Patent: Jul. 4, 2023

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 331 days.

(21) Appl. No.: 17/078,716

(22) Filed: Oct. 23, 2020

(65) Prior Publication Data

US 2021/0226237 A1 Jul. 22, 2021

(30) Foreign Application Priority Data

Jan. 22, 2020 (JP) .............................. JP2020-008590

(51) Int. Cl.
*H01M 8/04746* (2016.01)
*H01M 8/04082* (2016.01)
(Continued)

(52) U.S. Cl.
CPC ... *H01M 8/04753* (2013.01); *H01M 8/04097* (2013.01); *H01M 8/04164* (2013.01);
(Continued)

(58) Field of Classification Search
CPC ......... H01M 8/04753; H01M 8/04097; H01M 8/04164; H01M 8/04201; H01M 8/04388; H01M 8/04671; H01M 8/04843; H01M 8/04141; H01M 8/0662; H01M 8/04089; H01M 8/04328; H01M 8/04343; H01M 8/04402; H01M 8/04447; H01M 8/04462; H01M 8/045; H01M 8/04514; H01M 8/04679; H01M 8/04686; H01M 8/04708; H01M 8/04716; H01M 8/04761;
(Continued)

(56) References Cited

U.S. PATENT DOCUMENTS

| 2002/0022171 | A1* | 2/2002 | Saito ................. | H01M 8/04089 |
| | | | | 429/443 |
| 2013/0164641 | A1 | 6/2013 | Fukuda et al. | |
| 2016/0099477 | A1* | 4/2016 | Hwang ............. | H01M 8/04104 |
| | | | | 429/415 |

FOREIGN PATENT DOCUMENTS

| JP | S 56-114287 A | 9/1981 |
| JP | 2002-151116 A | 5/2002 |

(Continued)

*Primary Examiner* — Matthew W Van Oudenaren
(74) *Attorney, Agent, or Firm* — Finnegan, Henderson, Farabow, Garrett & Dunner, LLP

(57) ABSTRACT

A fuel cell system includes a fuel cell, first and second supply devices, a gas-liquid separator, a discharge valve, first and second ejectors for discharging fuel gas and off gas to the fuel cell, a measuring device for gas pressure, and a control device. The first ejector has a discharge amount smaller than the second ejector. The first ejector has a circulation amount larger than the second ejector. The control device executes the supply during a first time from the first supply device at each first cycle such that the pressure becomes a first target value, and when the first ejector is in an abnormal state, stops the first supply device, executes the supply during a shorter second time from the second supply device at each shorter second cycle such that the pressure becomes a higher second target value, and opens and closes the discharge valve at each first cycle.

7 Claims, 11 Drawing Sheets

(51) Int. Cl.
    *H01M 8/04119*    (2016.01)
    *H01M 8/0438*     (2016.01)
    *H01M 8/04089*    (2016.01)
    *H01M 8/04664*    (2016.01)
    *H01M 8/04828*    (2016.01)

(52) U.S. Cl.
    CPC ... *H01M 8/04201* (2013.01); *H01M 8/04388* (2013.01); *H01M 8/04671* (2013.01); *H01M 8/04843* (2013.01); *H01M 8/04141* (2013.01); *H01M 8/04761* (2013.01); *H01M 2250/20* (2013.01)

(58) Field of Classification Search
    CPC ......... H01M 8/04776; H01M 8/04783; H01M 8/04798; H01M 8/04805; H01M 8/04835
    See application file for complete search history.

(56) References Cited

FOREIGN PATENT DOCUMENTS

| | | |
|---|---|---|
| JP | 2010-242508 A | 10/2010 |
| JP | 2013-134882 A | 7/2013 |

\* cited by examiner

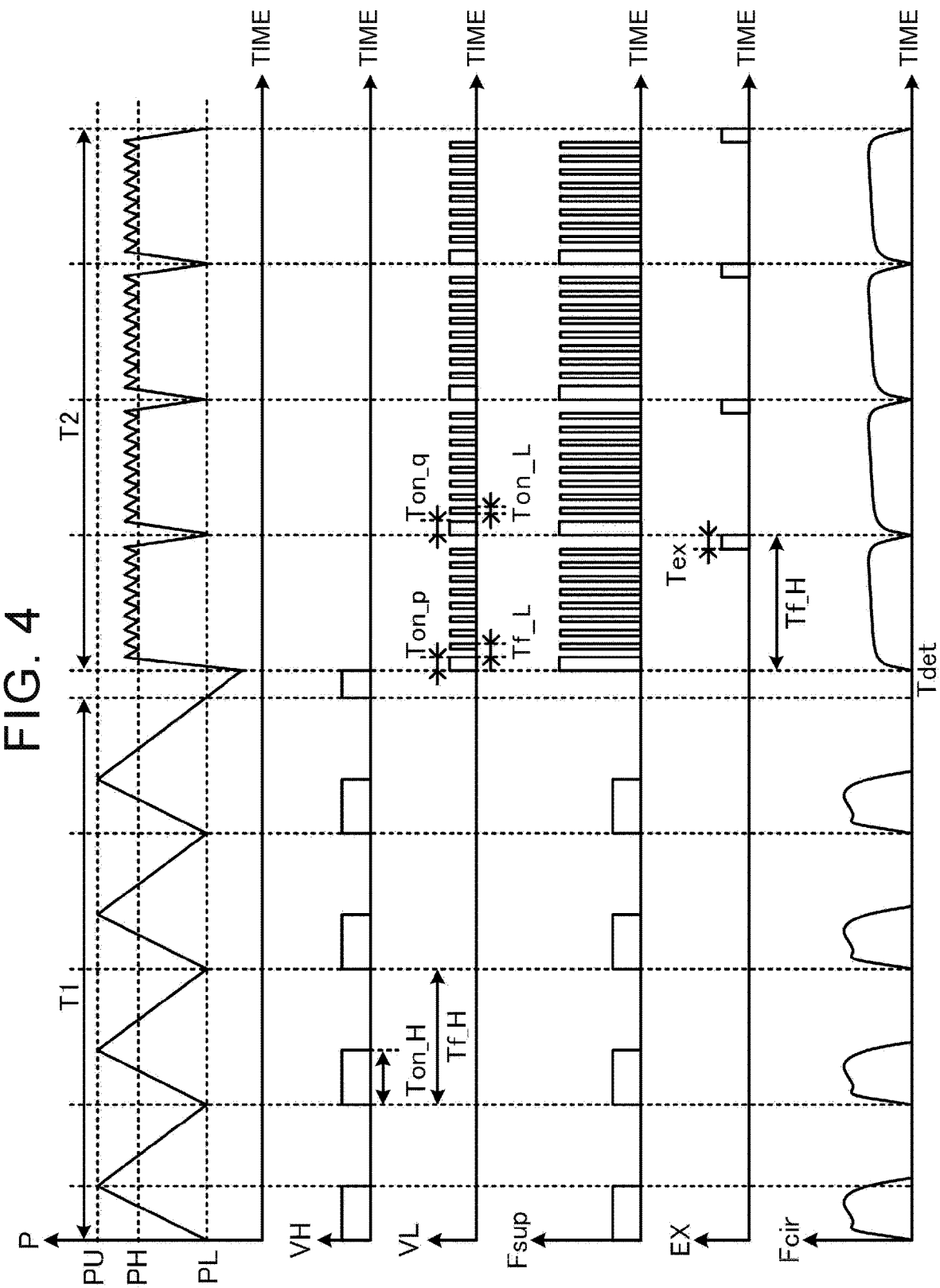

FUEL CELL SYSTEM

CROSS-REFERENCE TO RELATED APPLICATION

This application claims priority to Japanese Patent Application No. 2020-008590 filed on Jan. 22, 2020, incorporated herein by reference in its entirety.

BACKGROUND

1. Technical Field

The present disclosure relates to a fuel cell system.

2. Description of Related Art

In a fuel cell system, an ejector uses fuel gas injected from a nozzle into a diffuser as a driving gas to suck off gas discharged from the fuel cell into the diffuser, mixes the fuel gas and the off gas, and ejects the mixed gas toward the fuel cell (see, for example, Japanese Unexamined Patent Application Publication No. 2010-242508 (JP 2010-242508 A)). As a result, the off gas circulates to the fuel cell via the ejector.

SUMMARY

For example, two ejectors having different circulation characteristics may be provided in parallel in the fuel cell system, and may be properly selected for use depending on the operating state of the fuel cell. An ejector with high circulation characteristics (hereinafter referred to as "high-circulation ejector") has a smaller nozzle diameter and thus has smaller discharge amount per unit time but has larger circulation amount of off gas compared to an ejector with low circulation characteristics (hereinafter referred to as "low-circulation ejector").

For example, when the nozzle of the high-circulation ejector is frozen and blocked, gas cannot be supplied from the high-circulation ejector, so it is conceivable to execute the gas supply with the low-circulation ejector in place of the high-circulation ejector.

However, the low-circulation ejector has a larger discharge amount per unit time than the high-circulation ejector, and the supply amount of the fuel gas may be excessively larger than the amount required for power generation. On the other hand, when the time for gas supply from the low-circulation ejector is shortened, the supply amount of the fuel gas is reduced, so that the fluctuation range of the pressure in the anode system is reduced. Thus, it may be difficult to discharge anode liquid water through a gas-liquid separator by the circulation flow of the off gas.

Therefore, the present disclosure provides a fuel cell system that can replace gas supply using an ejector having relatively high circulation characteristics with gas supply using an ejector having relatively low circulation characteristics while suppressing excessive gas supply and deterioration of drainage properties.

A fuel cell system described in this specification includes: a fuel cell configured to generate electric power using fuel gas; a first supply device and a second supply device configured to respectively supply the fuel gas to the fuel cell; a gas-liquid separator configured to separate liquid water from off gas discharged from the fuel cell and to store the liquid water, a discharge valve configured to discharge the liquid water stored in the gas-liquid separator, a first ejector configured to suck the off gas from the gas-liquid separator using the fuel gas from the first supply device as a driving fluid and to discharge the off gas toward the fuel cell together with the fuel gas such that the off gas circulates to the fuel cell; a second ejector configured to suck the off gas from the gas-liquid separator using the fuel gas from the second supply device as a driving fluid and to discharge the off gas toward the fuel cell together with the fuel gas such that the off gas circulates to the fuel cell; a measuring device for measuring a pressure of the fuel gas at an inlet of the fuel cell; and a control device configured to control the first supply device, the second supply device, and the discharge valve. A discharge amount of the fuel gas per unit time from the first ejector is smaller than a discharge amount of the fuel gas per unit time from the second ejector. A circulation amount of the off gas circulating from the first ejector to the fuel cell by supply of a predetermined amount of the fuel gas is larger than a circulation amount of the off gas circulating from the second ejector to the fuel cell by the supply of the predetermined amount of the fuel gas. The control device is configured to execute the supply during a first time from the first supply device at each first cycle such that the pressure measured by the measuring device becomes a first target value. The control device is configured to, when a discharge of the fuel gas from the first ejector is in an abnormal state, stop the supply of the fuel gas from the first supply device, execute the supply during a second time from the second supply device at each second cycle such that the pressure measured by the measuring device becomes a second target value, and open and close the discharge valve at each first cycle. The second time is shorter than the first time, the second cycle is shorter than the first cycle, and the second target value is higher than the first target value.

According to the above configuration, in the fuel cell system, the off gas discharged from the fuel cell can be circulated to the fuel cell via the gas-liquid separator and the first ejector or the second ejector by the fuel gas supplied from the first supply device or the second supply device. Liquid water is separated from the off gas by the gas-liquid separator and stored in the gas-liquid separator. The control device can discharge the liquid water from the gas-liquid separator by controlling the opening/closing of the discharge valve.

The control device executes the supply from the first supply device during the first time at each first cycle such that the pressure of the fuel gas at the inlet of the fuel cell becomes the first target value. Further, when the discharge of the fuel gas from the first ejector is in an abnormal state, the control device stops the supply of the fuel gas from the first supply device and executes the supply from the second supply device.

Here, the discharge amount of the fuel gas per unit time from the first ejector is smaller than the discharge amount of the fuel gas per unit time from the second ejector. Further, the circulation amount of the off gas circulating from the first ejector to the fuel cell by supply of the predetermined amount of the fuel gas is larger than the circulation amount of the off gas circulating from the second ejector to the fuel cell by the supply of the predetermined amount of the fuel gas.

The control device executes the supply during the second time from the second supply device at each second cycle such that the pressure of the fuel gas at the inlet of the fuel cell becomes the second target value, and opens and closes the discharge valve at each first cycle. The second time is shorter than the first time, the second cycle is shorter than the first cycle, and the second target value is higher than the first target value.

As a result, the second supply device executes the supply of the fuel gas so that the pressure of the fuel gas at the inlet of the fuel cell increases to the second target value during a shorter period of time at a shorter cycle as compared with the supply of the fuel gas by the first supply device. Therefore, the decrease in the circulation amount of the off gas by the second ejector is suppressed by increasing the pressure and the supply frequency of the fuel gas. In addition, the pressure of the fuel gas at the inlet is highly accurately maintained at the second target value by the supply at high frequency and during a short period of time, thereby suppressing an excessive increase in the pressure of the fuel gas and suppressing an excessive supply of the fuel gas.

Further, since the control device opens and closes the discharge valve at the same first cycle as the supply of the fuel gas by the first supply device, the pressure of the fuel gas can be decreased from the second target value at each first cycle. Thus, even when the pressure of the fuel gas at the inlet is maintained at the second target value, the drainage properties are maintained because the pressure pulsates at each first cycle, as in the case of supplying the fuel gas by the first supply device.

According to the above configuration, the fuel cell system can replace gas supply using the first ejector having high circulation characteristics with gas supply using the second ejector having low circulation characteristics while suppressing excessive gas supply and deterioration of drainage properties.

In the above configuration, the second cycle may be shorter than a period of time during which a circulation flow of the off gas generated by the supply of the fuel gas from the second supply device is continued.

In the above configuration, the control device may be configured to open the discharge valve after executing the supply of the fuel gas from the second supply device for a plurality of times at each second cycle, and to close the discharge valve when the pressure measured by the measuring device becomes equal to or lower than the first target value.

In the above configuration, the control device may be configured to, after the supply of the fuel gas is executed from the first supply device and when the pressure measured by the measuring device drops below the first target value, execute the supply of the fuel gas from the first supply device again, and after the supply of the fuel gas is executed from the second supply device and when the pressure measured by the measuring device drops below the second target value, execute the supply of the fuel gas from the second supply device again.

In the above configuration, the second target value may be lower than a maximum value of the pressure measured by the measuring device when the supply of the fuel gas from the first supply device is executed.

In the above configuration, the control device may be configured to maintain the supply of the fuel gas from the second supply device until the pressure measured by the measuring device reaches the second target value when the discharge of the fuel gas from the first ejector is in the abnormal state or when the discharge valve is closed.

In the above configuration, the control device may be configured to determine whether the discharge of the fuel gas from the first ejector is in the abnormal state based on the pressure measured by the measuring device when the supply of the fuel gas from the first supply device is being executed.

According to the present disclosure, gas supply using an ejector having relatively high circulation characteristics can be replaced with gas supply using an ejector having relatively low circulation characteristics while suppressing excessive gas supply and deterioration of drainage properties.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a time chart showing an example of an operation of supplying anode gas from the low-circulation injector in place of the high-circulation injector.

DETAILED DESCRIPTION OF EMBODIMENTS

Configuration of Fuel Cell System 100

Figure 1:
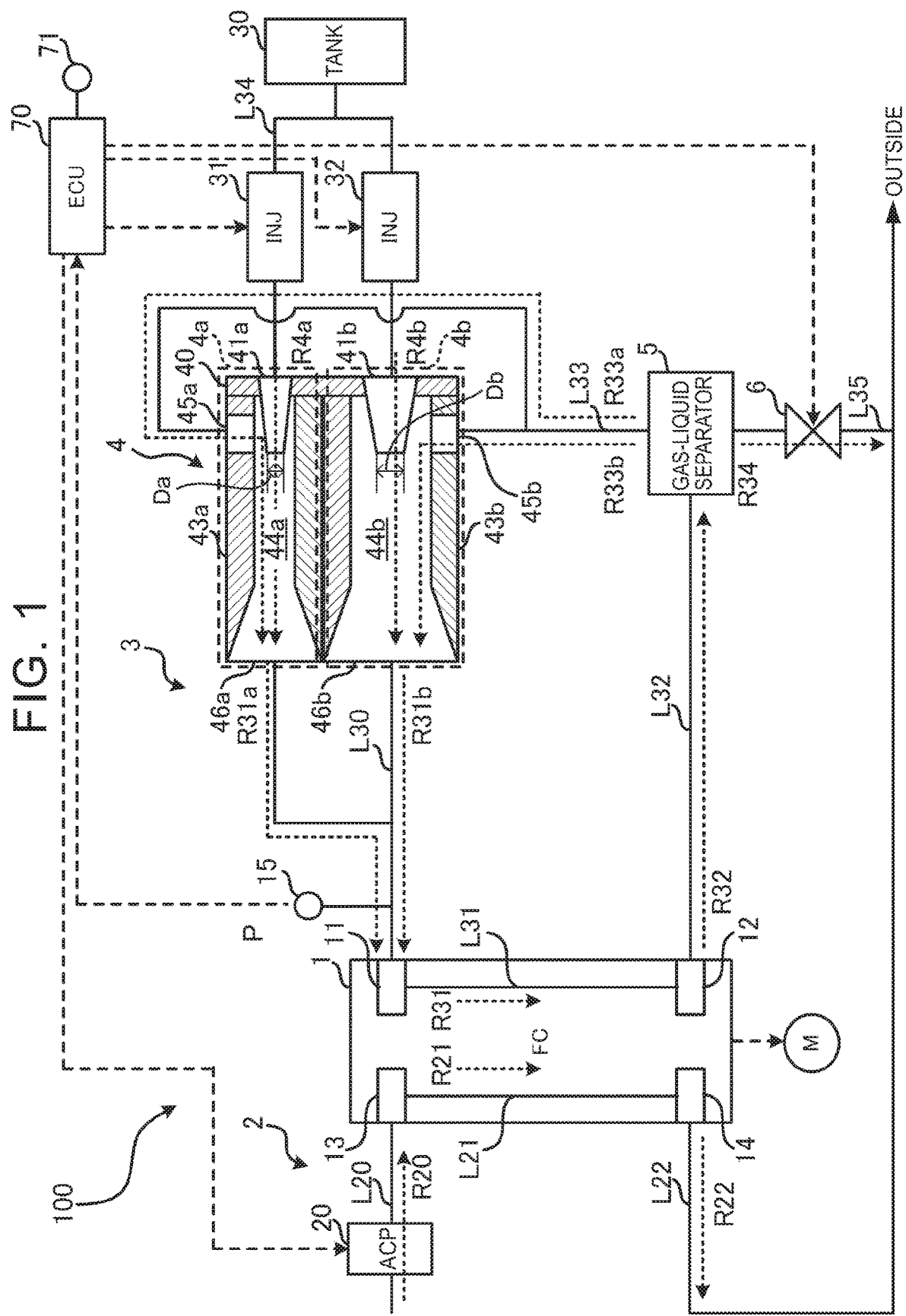
FIG. 1 is a configuration diagram showing an example of a fuel cell system.

FIG. 1 is a configuration diagram showing an example of a fuel cell system 100. The fuel cell system 100 is mounted in, for example, a fuel cell vehicle and includes a fuel cell (FC) 1, a motor M, a cathode system 2, an anode system 3, an electronic control unit (ECU) 70, and an accelerator operation amount sensor 71. Illustration of the electrical configuration for connecting the FC 1 and the motor M is omitted.

The FC 1 includes a stacked body of a plurality of solid polymer electrolyte unit cells. The FC 1 is supplied with cathode gas and anode gas and generates electric power by the chemical reaction of the cathode gas and the anode gas. In the present embodiment, air containing oxygen is used as the cathode gas, and hydrogen gas is used as the anode gas. The anode gas is an example of the fuel gas used for power generation. The electric power generated by the FC 1 is supplied to the motor M.

The FC 1 has an inlet 11 and an outlet 12 of the anode gas, and an inlet 13 and an outlet 14 of the cathode gas. The inlet 11 and the outlet 12 of the anode gas are connected via an anode gas flow path L31, and the inlet 13 and the outlet 14 of the cathode gas are connected via a cathode gas flow path L21. The anode gas flow path L31 and the cathode gas flow path L21 include a manifold extending through the stacked body of the unit cells, a groove provided in the separator of the unit cells, and the like. The inlet 11 of the anode gas is an example of the inlet of the fuel gas.

The cathode system 2 supplies air containing oxygen as the cathode gas to the FC 1. For example, the cathode system 2 includes a cathode supply pipe L20, a cathode discharge pipe L22, and an air compressor 20.

The end of the cathode supply pipe L20 on the downstream side is connected to the inlet 13 of the cathode gas of the FC 1. The air compressor (ACP) 20 is provided in the cathode supply pipe L20. The air compressor 20 compresses the cathode gas. The cathode gas flows through the cathode supply pipe L20 and is supplied to the FC 1, as shown by an arrow R20. The cathode gas in the FC 1 is used for power generation by flowing from the inlet 13 through the cathode gas flow path L21 and chemically reacting with the anode gas as shown by an arrow R21.

The end of the cathode discharge pipe L22 on the upstream side is connected to the outlet 14 of cathode off-gas of the FC 1. The FC 1 discharges the cathode gas used for power generation as the cathode off-gas from the outlet 14 to the cathode discharge pipe L22. The cathode off-gas flows through the cathode discharge pipe L22 and is discharged to the outside, as shown by an arrow R22.

The anode system 3 supplies the anode gas to the FC 1. The anode system 3 includes an anode supply pipe L30, an anode discharge pipe L32, a return pipe L33, a connection pipe L34, an exhaust drainage pipe L35, a fuel tank 30, a high-circulation injector (INJ) 31, a low-circulation injector 32, a pressure sensor 15, an ejector unit 4, a gas-liquid separator 5, and an anode discharge valve 6.

The anode gas is stored in the fuel tank 30 in a high pressure state. The fuel tank 30 is connected to the high-circulation INJ 31 and the low-circulation INJ 32 via the connection pipe L34 that branches into two. The fuel tank 30 supplies the anode gas to the high-circulation INJ 31 and the low-circulation INJ 32.

The high-circulation INJ 31 and the low-circulation INJ 32 intermittently inject the anode gas based on a pulse width modulation (PWM) signal input from the ECU 70. The high-circulation INJ 31 and the low-circulation INJ 32 inject the anode gas when the PWM signal indicates ON, and stop the injection of the anode gas when the PWM signal indicates OFF. The high-circulation INJ 31 and the low-circulation INJ 32 perform injection at the injection cycle and during the injection time based on the PWM signal. The high-circulation INJ 31 and the low-circulation INJ 32 are examples of a first supply device and a second supply device, respectively, that supply the fuel gas to the FC 1. The high-circulation INJ 31 and the low-circulation INJ 32 are connected to the ejector unit 4.

FIG. 1 shows a section of the ejector unit 4 along the direction in which the anode gas flows. The ejector unit 4 includes a high-circulation ejector 4a and a low-circulation ejector 4b having different anode off-gas circulation characteristics.

The high-circulation ejector 4a has a small diameter nozzle 41a and a diffuser 43a. The low-circulation ejector 4b has a large diameter nozzle 41b and a diffuser 43b. The high-circulation ejector 4a and the low-circulation ejector 4b share a plate-shaped fixing portion 40. Examples of the material of the ejector unit 4 include steel use stainless (SUS), but the material is not limited to this.

The fixing portion 40 fixes the small diameter nozzle 41a and the large diameter nozzle 41b. The inlet of the small diameter nozzle 41a is connected to the injection port of the high-circulation INJ 31, and the inlet of the large diameter nozzle 41b is connected to the injection port of the low-circulation INJ 32.

The small diameter nozzle 41a injects the anode gas from the high-circulation INJ 31 toward a discharge passage 44a in the diffuser 43a, as shown by an arrow R4a. The large diameter nozzle 41b injects the anode gas from the low-circulation INJ 32 toward a discharge passage 44b in the diffuser 43b, as shown by an arrow R4b.

Inflow ports 45a and 45b connected to the return pipe L33 are provided on the side surfaces of the diffusers 43a and 43b, respectively. The return pipe L33 is branched into two from the gas-liquid separator 5 and connected to the inflow ports 45a and 45b. The anode off-gas flowing through the return pipe L33 is sucked into the discharge passage 44a in the diffuser 43a from the inflow port 45a as shown by an arrow R33a by using the anode gas injected by the small diameter nozzle 41a as a driving fluid. The anode gas and the anode off-gas are mixed in the discharge passage 44a and discharged from an outlet 46a to the anode supply pipe L30.

The anode off-gas flowing through the return pipe L33 is sucked into the discharge passage 44b in the diffuser 43b from the inflow port 45b as shown by an arrow R33b by using the anode gas injected by the large diameter nozzle 41b as a driving fluid. The anode gas and the anode off-gas are mixed in the discharge passage 44b and discharged from an outlet 46b to the anode supply pipe L30.

The anode supply pipe L30 is branched into two from the inlet 11 of the anode gas of the FC 1 and is connected to the outlets 46a and 46b of the discharge passages 44a and 44b. The anode gas and the anode off-gas discharged from the outlets 46a and 46b of the discharge passages 44a and 44b enter the inlet 11 of the FC 1 as shown by arrows R31a and R31b.

In this way, the high-circulation ejector 4a sucks the anode off-gas from the gas-liquid separator 5 using the anode gas from the high-circulation INJ 31 as a driving fluid, and discharges the anode off-gas and the anode gas toward the FC 1 so that the anode off-gas circulates to the FC 1. Further, the low-circulation ejector 4b sucks the anode off-gas from the gas-liquid separator 5 using the anode gas from the low-circulation INJ 32 as a driving fluid, and discharges the anode off-gas and the anode gas toward the FC 1 so that the anode off-gas circulates to the FC 1.

Therefore, the fuel cell system 100 uses the anode gas supplied from the high-circulation INJ 31 or the low-circulation INJ 32 to circulate the anode off-gas discharged from the FC 1 via the gas-liquid separator 5 and the high-circulation ejector 4a or the low-circulation ejector 4b. The high-circulation ejector 4a is an example of a first ejector, and the low-circulation ejector 4b is an example of a second ejector.

The diameter Db of the injection port of the large diameter nozzle 41b is larger than the diameter Da of the injection port of the small diameter nozzle 41a. Thus, as described later, the circulation characteristics of the anode off-gas of the high-circulation ejector 4a and those of the low-circulation ejector 4b are different. The anode off-gas is an example of off gas discharged from a fuel cell.

The pressure sensor 15 is provided in the anode supply pipe L30. The pressure sensor 15 is disposed near the inlet 11 of the anode gas of the FC 1 and measures the pressure at the inlet 11. The pressure sensor 15 is an example of a measuring device that measures the pressure.

The anode gas and the circulated anode off-gas flow from the inlet 11 through the anode gas flow path L31 and are used for power generation, as shown by an arrow R31. One end of the anode discharge pipe L32 is connected to the outlet 12 of the anode off-gas of the FC 1, and the other end of the anode discharge pipe L32 is connected to the gas-liquid separator 5. The used anode gas flows, as the anode off-gas, from the outlet 12 through the anode discharge pipe L32 and enters the gas-liquid separator 5 as shown by an arrow R32.

The gas-liquid separator 5 separates liquid water from the anode off-gas discharged from the outlet 12 and stores the liquid water. One end of the exhaust drainage pipe L35 is connected to the gas-liquid separator 5, and the other end of the exhaust drainage pipe L35 is connected to the cathode discharge pipe L22. The exhaust drainage pipe L35 is provided with the anode discharge valve 6.

The anode discharge valve 6 is an example of a discharge valve for discharging the liquid water stored in the gas-liquid separator 5. When the anode discharge valve 6 is opened, the liquid water and a part of the anode off-gas flowing out from the gas-liquid separator 5 flow to the cathode discharge pipe L22 through the exhaust drainage pipe L35, and are discharged to the outside together with the cathode off-gas, as shown by an arrow R34. Thus, the ECU 70 can discharge the liquid water from the gas-liquid separator 5 by controlling the opening/closing of the anode discharge valve 6.

The accelerator operation amount sensor 71 detects the operation amount of an accelerator (not shown) of the fuel cell vehicle and notifies the ECU 70 of the detected operation amount.

The ECU 70 includes a central processing unit (CPU), a read-only memory (ROM), and a random access memory (RAM). The pressure sensor 15, the accelerator operation amount sensor 71, the air compressor 20, the high-circulation INJ 31, the low-circulation INJ 32, and the anode discharge valve 6 are electrically connected to the ECU 70. The ECU 70 controls, for example, the operation of the air compressor 20, the turning ON and OFF of the high-circulation INJ 31 and the low-circulation INJ 32, and the opening and closing of the anode discharge valve 6.

The ECU 70 executes the supply of the anode gas by performing on/off control of the high-circulation INJ 31 or the low-circulation INJ 32 based on the electric power required for the FC 1 (hereinafter referred to as "required power"), for example. The required power is determined based on the detection value of the accelerator operation amount sensor 71, for example. The ECU 70 performs the on/off control of the high-circulation INJ 31 when the required power is lower than a threshold, and performs the on/off control of the low-circulation INJ 32 when the required power is equal to or higher than the threshold.

The ECU 70 performs the on/off control by determining the cycle and the pulse width of the PWM signal. The pulse width of the PWM signal corresponds to the ON time during which the high-circulation INJ 31 and the low-circulation INJ 32 continue to supply the anode gas, that is, the injection time of the anode gas, and the cycle of the PWM signal corresponds to the supply cycle at which the high-circulation INJ 31 and the low-circulation INJ 32 supply the anode gas. The remaining time obtained by subtracting the ON time from the cycle corresponds to the OFF time during which the high-circulation INJ 31 and the low-circulation INJ 32 stop the supply of the anode gas.

The high-circulation INJ 31 and the low-circulation INJ 32 have the same anode gas supply characteristics. For example, the high-circulation INJ 31 and the low-circulation INJ 32 cause the same supply amounts of the anode gas to respectively flow to the high-circulation ejector 4a and to the low-circulation ejector 4b during a predetermined ON time.

However, since sizes of the diameter Da of the small diameter nozzle 41a of the high-circulation ejector 4a and the diameter Db of the large diameter nozzle 41b of the low-circulation ejector 4b are different, the circulation characteristics of the anode off-gas using the high-circulation ejector 4a and the low-circulation ejector 4b are also different.

Circulation Characteristics of High-circulation Ejector 4a and Low-circulation Ejector 4b

Figure 2:
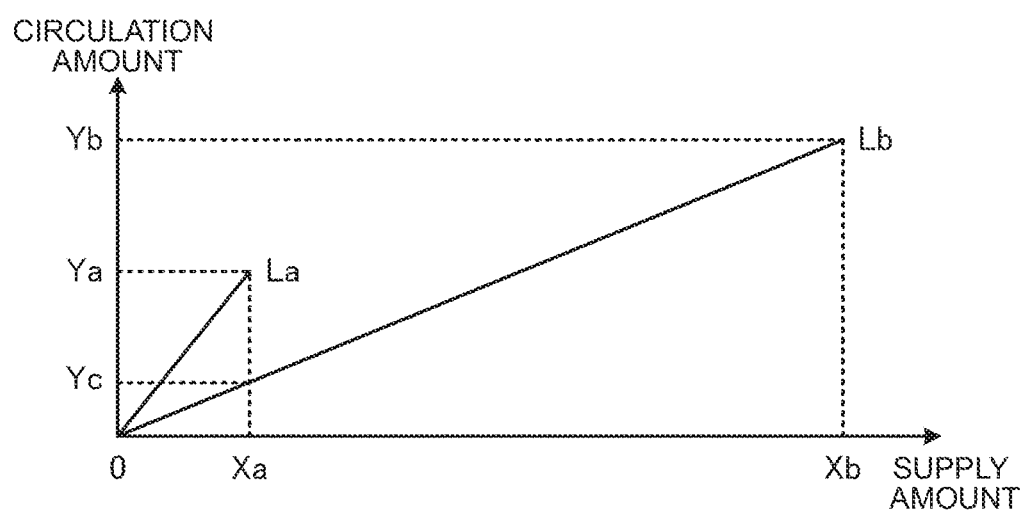
FIG. 2 is a diagram showing an example of circulation characteristics of anode off-gas using a high-circulation ejector and a low-circulation ejector.

FIG. 2 is a diagram showing an example of the circulation characteristics of the anode off-gas using the high-circulation ejector 4a and the low-circulation ejector 4b. The horizontal axis represents the supply amount of the anode gas from the high-circulation INJ 31 and the low-circulation INJ 32 in unit time, and the vertical axis represents the circulation amount of the anode off-gas using the high-circulation ejector 4a and the low-circulation ejector 4b. Here, the circulation amount of the anode off-gas is a flow rate of the anode off-gas sucked from the inflow ports 45a and 45b in unit time using the anode gas flowing through the diffusers as a driving fluid.

A reference symbol La indicates the circulation characteristics of the high-circulation ejector 4a, and a reference symbol Lb indicates the circulation characteristics of the low-circulation ejector 4b. The supply amount of the high-circulation ejector 4a is in the range of zero to Xa, and the supply amount of the low-circulation ejector 4b is in the range of zero to Xb. Note that Xb corresponds to the maximum required power of the FC 1. The circulation amount of the high-circulation ejector 4a at the supply amount Xa is set to Ya, and the circulation amount of the low-circulation ejector 4b at the supply amount Xb is set to Yb (>Ya).

The circulation amount of the anode off-gas is proportional to the supply amount of the anode gas. The inclination of the circulation characteristics indicated by the reference symbol La is larger than the inclination of the circulation characteristics indicated by the reference symbol Lb. Therefore, for example, when the supply amount is Xa, the circulation amount Yc of the low-circulation ejector 4b is smaller than the circulation amount Ya of the high-circulation ejector 4a.

As described above, the circulation amount of the anode off-gas circulated from the high-circulation ejector 4a to the FC 1 by the supply of a predetermined amount of the anode gas is larger than the circulation amount of the anode off-gas circulated from the low-circulation ejector 4b to the FC 1 by the supply of the predetermined amount of the anode gas.

Figure 3A:
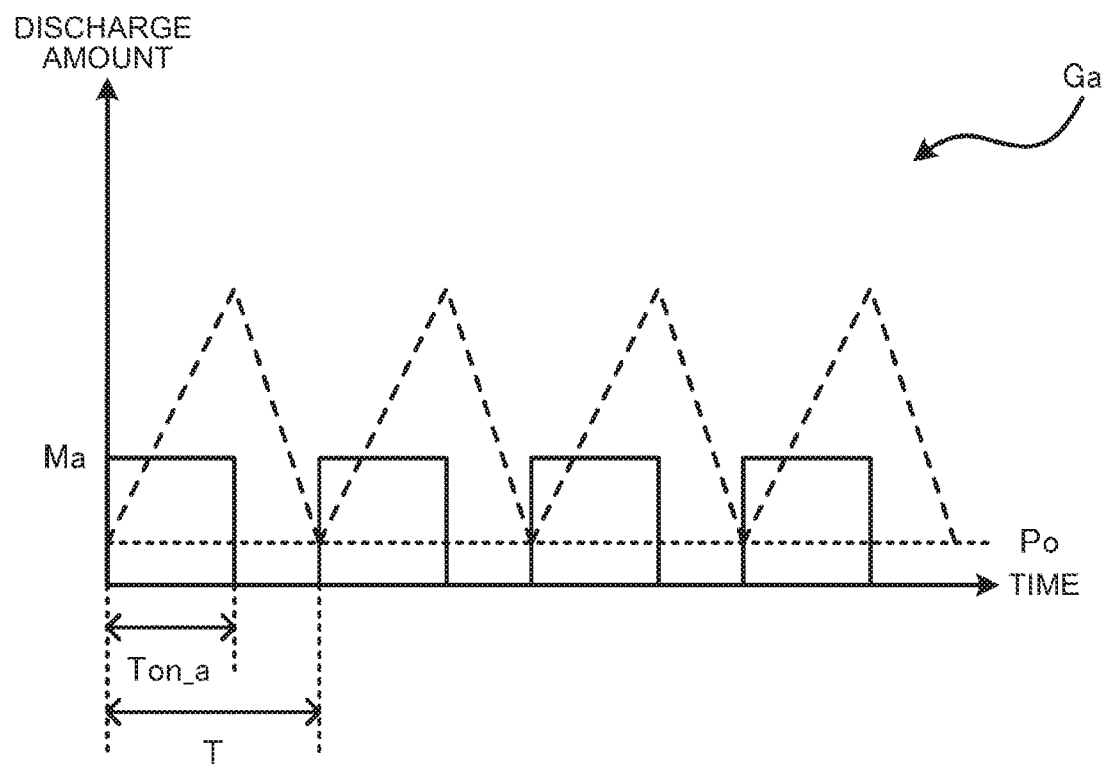
FIG. 3A is a diagram showing an example of on/off control of a high-circulation injector in a normal state.
Figure 3B:
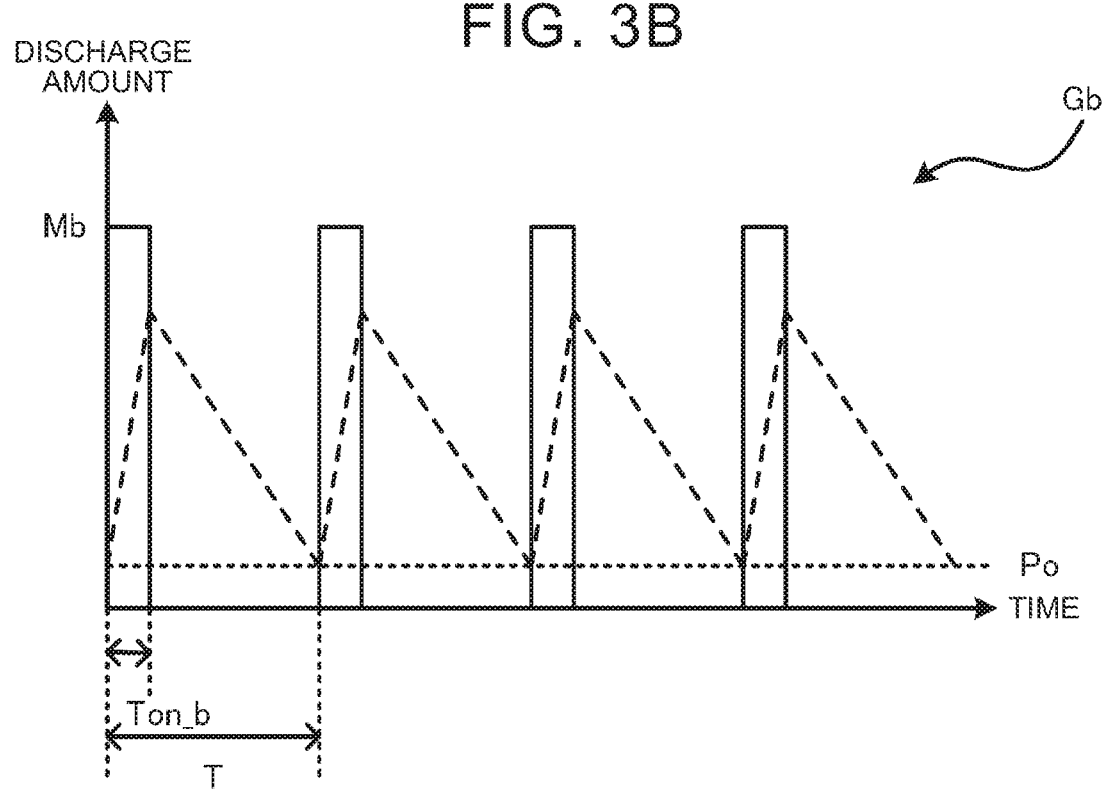
FIG. 3B is a diagram showing an example of on/off control of a low-circulation injector in a normal state.

On/Off Control of High-circulation INJ 31 and Low-circulation INJ 32 in Normal State FIG. 3A is a diagram showing an example of the on/off control of the high-circulation INJ 31 in a normal state. FIG. 3B is a diagram showing an example of the on/off control of the low-circulation INJ 32 in a normal state. These examples show a case where no failure has occurred in the low-circulation ejector 4b and the on/off control is performed on the high-circulation INJ 31 and the low-circulation INJ 32 based on the required power of the FC 1.

A reference symbol Ga indicates a temporal change in the discharge amount of the anode gas from the high-circulation ejector 4a based on the on/off control of the high-circulation INJ 31. A reference symbol Gb indicates a temporal change in the discharge amount of the anode gas from the low-circulation ejector 4b based on the on/off control of the low-circulation INJ 32. The dashed lines show the temporal changes in the pressure at the inlet 11 of the FC 1 due to the discharge of the anode gas.

The ECU 70 executes the supply of the anode gas from the high-circulation INJ 31 or the low-circulation INJ 32. The ECU 70 executes the supply from the high-circulation INJ 31 during the ON time Ton_a at each supply cycle T, or executes the supply from the low-circulation ejector 4b during the ON time Ton_b at each supply cycle T. The anode gas supplied from the high-circulation INJ 31 or the low-circulation INJ 32 is discharged to the FC 1 from the high-circulation ejector 4a or the low-circulation ejector 4b. The ECU 70 calculates the supply cycle T and the ON times Ton_a and Ton_b based on the required power of the FC 1.

The pressure increases each time the anode gas is discharged from the high-circulation INJ 31 and the low-circulation INJ 32. The discharge amount Ma of the anode gas from the high-circulation ejector 4a per unit time is smaller than the discharge amount Mb of the anode gas from the low-circulation ejector 4b per unit time due to the difference between the diameters Db and Da of the large diameter nozzle 41b and the small diameter nozzle 41a.

In view of this, the ECU 70 sets the ON time Ton_b of the low-circulation INJ 32 to be shorter than the ON time Ton_a of the high-circulation INJ 31 in order to maintain the target minimum value (hereinafter referred to as "target value") Po of the pressure at the inlet 11 of the anode gas of the FC 1. This suppresses an excessively large amount of anode gas with respect to the supply amount based on the target value Po of the pressure from being discharged.

Operation of Discharge from High-circulation Ejector 4a in Abnormal State

When the discharge of the anode gas from the high-circulation ejector 4a is in an abnormal state, the ECU 70 stops the supply of the anode gas from the high-circulation INJ 31 and starts the supply of the anode gas from the low-circulation INJ 32 in place of the high-circulation INJ 31. As described above, the high-circulation ejector 4a and the low-circulation ejector 4b have different supply amounts and different circulation characteristics, although the supply amounts of the anode gas are the same. Therefore, the ECU 70 determines the target pressure at the inlet 11 of the FC 1, the supply cycle, and the ON time for the low-circulation ejector 4b so that the circulation characteristics that are substantially the same as those of the high-circulation ejector 4a are obtained while suppressing excessive supply of the anode gas.

FIG. 4 is a time chart showing an example of an operation of supplying the anode gas from the low-circulation INJ 32 in place of from the high-circulation INJ 31. FIG. 4 shows an example of the temporal changes of a pressure P at the inlet 11 of the anode gas of the FC 1, PWM signals VH and VL respectively input to the high-circulation INJ 31 and the low-circulation INJ 32, a gas flow rate Fsup of the anode gas discharged from the high-circulation ejector 4a or the low-circulation ejector 4b to the FC 1, an opening/closing signal EX of the anode discharge valve 6, and a circulation flow rate Fcir of the anode off-gas.

A period T1 is a period in which, of the high-circulation INJ 31 and the low-circulation INJ 32, the on/off control on only the high-circulation INJ 31 is performed. A period T2 is a period in which, of the high-circulation INJ 31 and the low-circulation INJ 32, the on/off control on only the low-circulation INJ 32 is performed. When the ECU 70 detects an abnormality in the discharge of the anode gas from the high-circulation ejector 4a based on the pressure P measured by the pressure sensor 15 in the period T1, the ECU 70 starts the on/off control for the period T2.

In the period T1, the ECU 70 executes the supply from the high-circulation INJ 31 during the ON time Ton_H at each supply cycle Tf_H so that the pressure P becomes the target value PL. The ECU 70 determines the supply cycle Tf_H and the ON time Ton_H based on the target value PL. As a result, the PWM signal VH is turned on only during the ON time Ton_H at each supply cycle Tf_H. The target value PL is an example of a first target value, the supply cycle Tf_H is an example of a first cycle, and the ON time Ton_H is an example of a first time.

The flow rate Fsup of the anode gas from the high-circulation INJ 31 is set to a predetermined amount only during the ON time Ton_H at each supply cycle Tf_H. As a result, the pressure P at the inlet 11 of the anode gas of the FC 1 increases in proportion to time. When the supply of the anode gas from the high-circulation INJ 31 is stopped, the pressure P decreases. As a result, the pressure P decreases from the maximum value PU over time. When the pressure P reaches the target value PL, the supply of the anode gas in the next supply cycle Tf_H is executed. Therefore, pressure pulsation occurs at each supply cycle Tf_H, and thus the liquid water in the anode gas flow path L31 and the anode discharge pipe L32 is collected in the gas-liquid separator 5.

As the flow rate Fsup of the anode gas increases and decreases, the circulation flow rate Fcir of the anode off-gas also increases and decreases. The circulation flow rate Fcir of the anode off-gas continues to decrease even after the flow rate Fsup of the anode gas becomes zero.

The ECU 70 repeats the supply of the anode gas from the high-circulation INJ 31 for a predetermined number of times, for example. The ECU 70 determines the normality of the discharge of the anode gas from the high-circulation ejector 4a each time the supply of the anode gas is executed. When the ECU 70 detects that the pressure P does not increase during the ON time Ton_H of the high-circulation INJ 31, the ECU 70 determines that the discharge of the anode gas from the high-circulation ejector 4a is in an abnormal state. In this example, since the pressure P decreases at time Tdet during the ON time Ton_H of the high-circulation INJ 31, it is determined that the discharge of the anode gas is in an abnormal state.

Causes of abnormal discharge of the anode gas from the high-circulation ejector 4a include, for example, blockage in the small diameter nozzle 41a or in the discharge passage 44a due to frozen water caused by temperature decrease, and failure of the high-circulation INJ 31. However, the causes thereof are not limited to this.

In the period T2, the ECU 70 changes the target value of the pressure P from the target value PL in the period T1 to a new target value PH. The target value PH in the period T2 is higher than the target value PL in the period T1. The ECU 70 opens and closes the anode discharge valve 6 at each supply cycle Tf_H in the period T1, and executes the following on/off control of the low-circulation INJ 32 at each supply cycle Tf_H. The target value PH is an example of a second target value.

The ECU 70 executes the supply of the anode gas from the low-circulation INJ 32 during the ON time Ton_L at each supply cycle Tf_L so that the pressure P becomes the target value PH. The supply cycle Tf_L in the period T2 is shorter than the supply cycle Tf_H in the period T1, and the ON time Ton_L in the period T2 is shorter than the ON time Ton_H in the period T1. The ECU 70 outputs the PWM signal VL corresponding to the supply cycle Tf_L and the ON time Ton_L to the low-circulation INJ 32. The supply cycle Tf_L is an example of a second cycle, and the ON time Ton_L is an example of a second time.

As a result, the low-circulation INJ 32 executes the supply of the anode gas during a shorter period of time at a shorter cycle as compared with the supply of the anode gas by the high-circulation INJ 31 so that the pressure P at the inlet 11 of the anode gas of the FC 1 increases from the target value PL to the target value PH. The flow rate Fsup of the anode gas discharged from the low-circulation ejector 4b increases and decreases based on the PWM signal VL.

Accordingly, the decrease in the circulation amount of the anode off-gas using the low-circulation ejector 4b is suppressed by increasing the pressure P of the anode gas and the supply frequency. Therefore, even when the low-circulation ejector 4b having low circulation characteristics is used, the average circulation flow rate Fcir of the anode off-gas similar to that in the period T1 can be maintained, and thus the liquid water in the anode gas flow path L31 and the anode discharge pipe L32 can be collected in the gas-liquid separator 5.

Here, the supply cycle Tf_L is shorter than the time during which the circulation flow of the anode off-gas generated by the supply of the anode gas from the low-circulation INJ 32 is continued. Thus, the circulation flow of the anode off-gas can be increased within the supply cycle Tf_L as described below.

Figure 5:
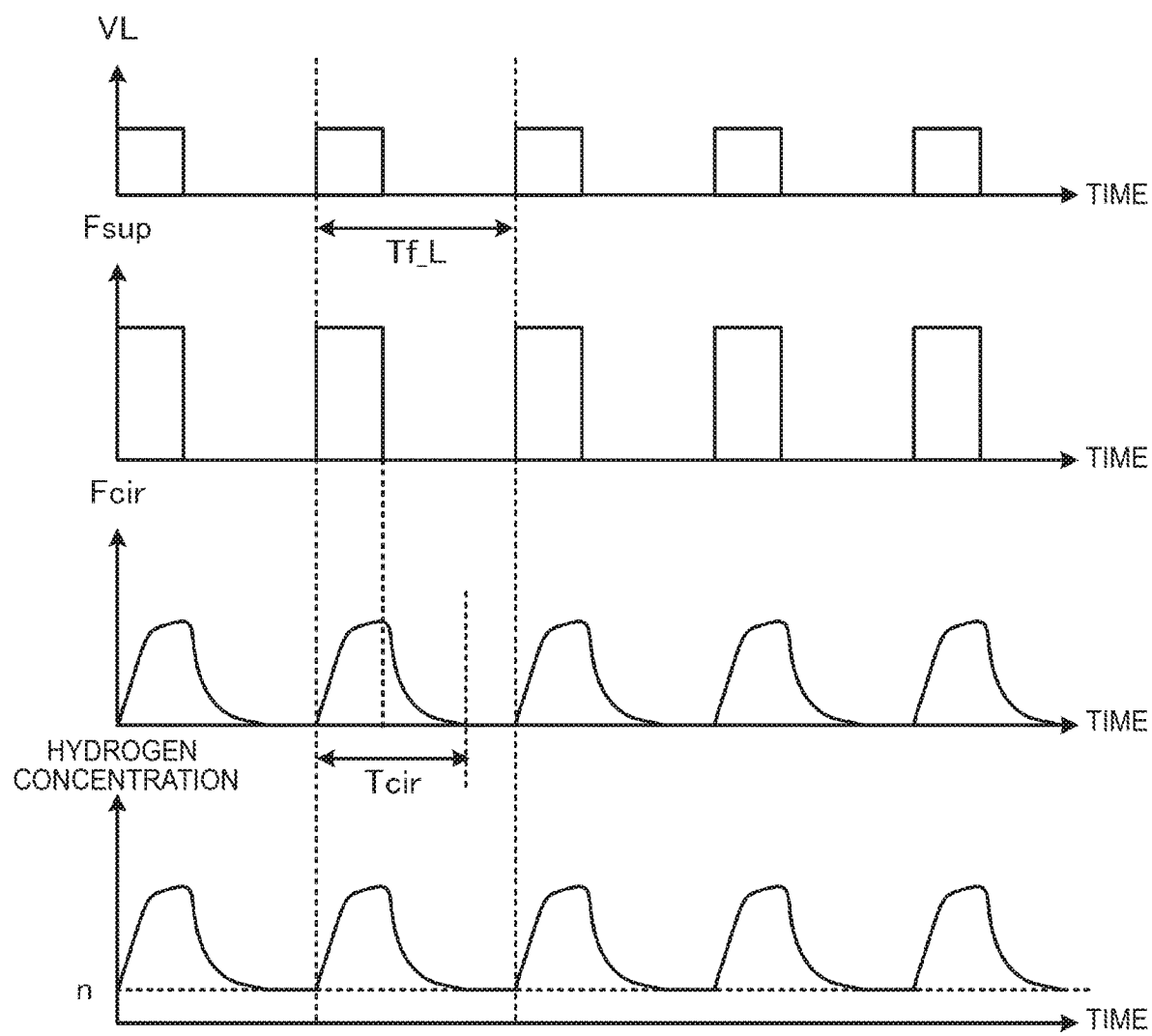
FIG. 5 is a diagram showing an example of a cycle of the on/off control of the low-circulation injector.

FIG. 5 is a diagram showing an example of a cycle of the on/off control of the low-circulation INJ 32. FIG. 5 shows an example of temporal changes in the PWM signal VL input to the low-circulation INJ 32, the flow rate Fsup of the anode gas discharged from the low-circulation ejector 4b to the FC 1, the circulation flow rate Fcir of the anode off-gas, and hydrogen concentration in the anode off-gas sucked into the low-circulation ejector 4b. Here, it is assumed that the anode gas is hydrogen gas.

The low-circulation INJ 32 supplies the anode gas at each supply cycle Tf_L based on the PWM signal VL. Thus, the flow rate Fsup of the anode gas increases and decreases at each supply cycle Tf_L.

The circulation flow rate Fcir of the anode off-gas increases with the increase in the flow rate Fsup of the anode gas, and continues to decrease to some extent even after the flow rate Fsup of the anode gas becomes zero. The hydrogen concentration in the anode off-gas also increases from a value n with the increase in the flow rate Fsup of the anode gas, and does not immediately return to the value n but gradually decreases even after the flow rate Fsup of the anode gas becomes zero. Note that the period of time during which the circulation flow of the anode gas is continued is referred to as a time period Tcir.

In this example, the supply cycle Tf_L is longer than the time period Tcir. Thus, the circulation flow rate Fcir of the anode off-gas once increases at each supply cycle Tf_L, but decreases to zero, returning to the state before the increase. Also, the hydrogen concentration in the anode off-gas once increases, but decreases to the value n, returning to the state before the increase.

Figure 6:
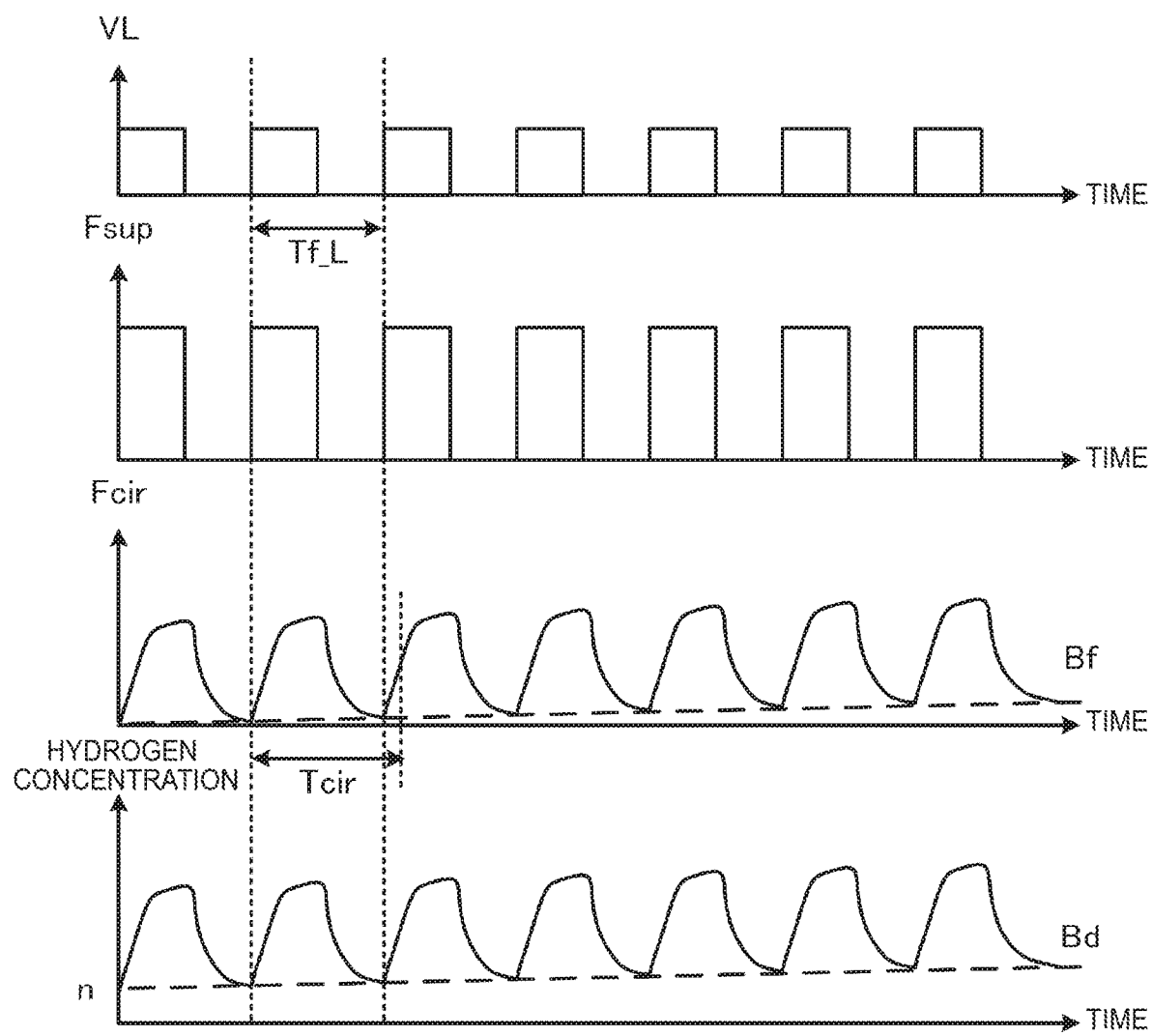
FIG. 6 is a diagram showing another example of a cycle of the on/off control of the low-circulation injector.

FIG. 6 is a diagram showing another example of a cycle of the on/off control of the low-circulation INJ 32. In FIG. 6, description of contents similar to FIG. 5 is omitted.

In this example, the supply cycle Tf_L is shorter than the time period Tcir. Thus, the circulation flow of the anode off-gas does not become zero each time the supply cycle Tf_L ends. Therefore, the initial value of the circulation flow rate Fcir of the anode off-gas increases at each supply cycle Tf_L as indicated by a dashed line Bf.

Further, the hydrogen concentration in the anode off-gas does not return to the value n each time the supply cycle Tf_L ends. Therefore, the initial value of the hydrogen concentration of the anode off-gas increases at each supply cycle Tf_L as indicated by a dashed line Bd.

As a result, the circulation amount of the anode off-gas in the period T2 is maintained at a similar circulation amount in the period T1 on time average.

Further, the concentration of the hydrogen gas in the anode off-gas also increases with the increase in the pressure P from the target value PL to the target value PH.

Figure 7:
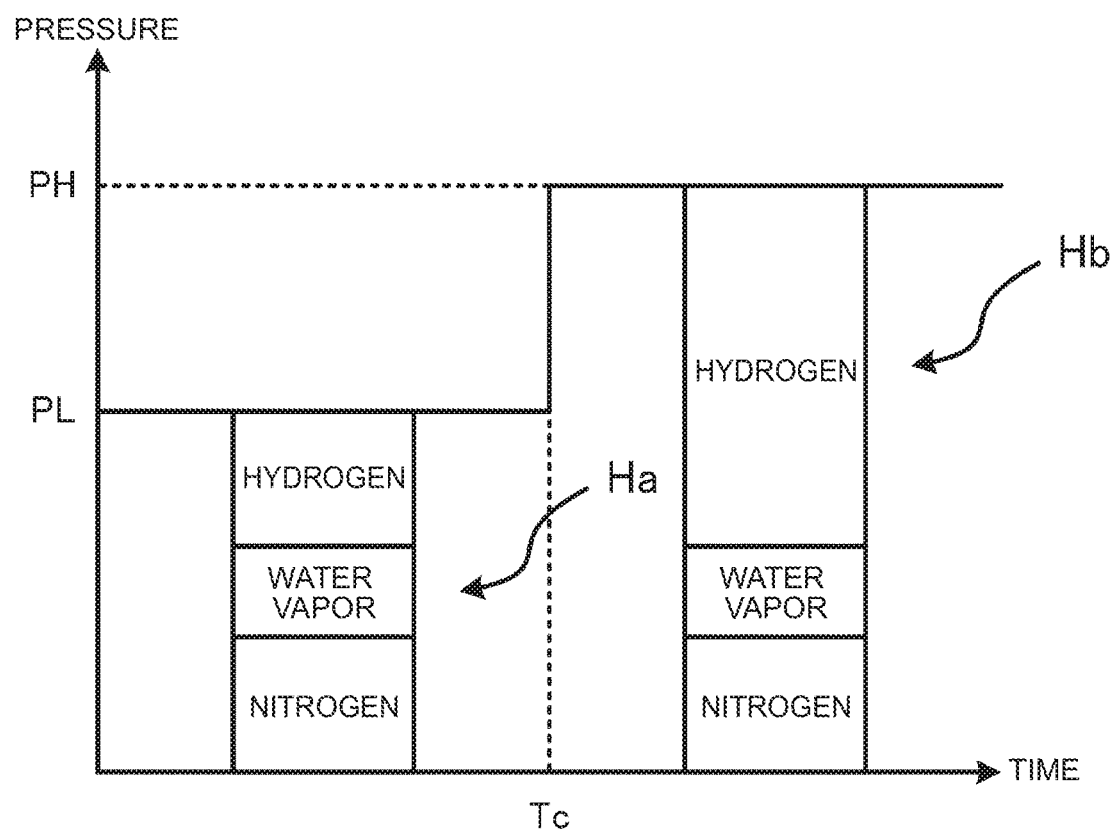
FIG. 7 is a diagram showing an example of changes in the concentration of the anode off-gas due to changes in pressure.

FIG. 7 is a diagram showing an example of changes in the concentration of the anode off-gas due to changes in the pressure P. As an example, the pressure P increases from the target value PL to the target value PH at time Tc.

A reference symbol Ha indicates the ratio of the concentration of each type of gas in the anode off-gas when the pressure P is the target value PL, and a reference symbol Hb indicates the ratio of the concentration of each type of gas in the anode off-gas when the pressure P is the target value PH. The anode off-gas contains hydrogen gas that is not used for power generation, water vapor generated by power generation, and nitrogen gas as an impurity.

When the pressure P increases from the target value PL to the target value PH, the concentration of the hydrogen gas increases, as indicated by the reference symbol Hb. Since the specific gravity of the hydrogen gas is smaller than that of the water vapor and the nitrogen gas, the weight of the anode off-gas sucked into the low-circulation ejector 4b through the inflow port 45b is reduced.

In the low-circulation ejector 4b, the sum of the momentum (=weight×velocity) of the anode off-gas flowing from the inflow port 45b and the momentum of the anode gas injected from the large diameter nozzle 41b is equal to the momentum of the anode gas and the anode off-gas discharged from the outlet 46b of the discharge passage 44b, according to the momentum conservation law. Thus, when the weight of the anode off-gas sucked into the low-circulation ejector 4b from the inflow port 45b decreases, the flow velocity of the anode off-gas increases. Therefore, the volumetric flow rate of the anode off-gas that circulates from the low-circulation ejector 4b to the FC 1 increases.

Referring again to FIG. 4, in the period T2, the pressure P is maintained at the target value PH with high accuracy with the supply of the anode gas at a high frequency and in a short period of time as compared with the period T1. This suppresses an excessive increase in the pressure of the anode gas and suppresses excessive supply of the anode gas.

The ECU 70 opens/closes the anode discharge valve 6 at the same supply cycle Tf_H as that for the supply of the anode gas by the high-circulation INJ 31. The ECU 70 switches the opening/closing signal EX of the anode discharge valve 6 to ON (open) and OFF (close) at each supply cycle Tf_H.

Therefore, the pressure P can be reduced from the target value PH at each supply cycle Tf_H, and even when the pressure P is maintained at the target value PH, drainage properties are maintained by pressure pulsation of the anode gas, as in the case where the anode gas is supplied by the high-circulation INJ 31 in the period T1. If the anode discharge valve 6 is not opened/closed, the pressure pulsation does not occur because the pressure P is substantially maintained near the target value PH. The ECU 70 determines time Tex for maintaining the anode discharge valve 6 in the open state so that the pressure P decreases to the target value PL of the period T1, for example.

Figure 8A:
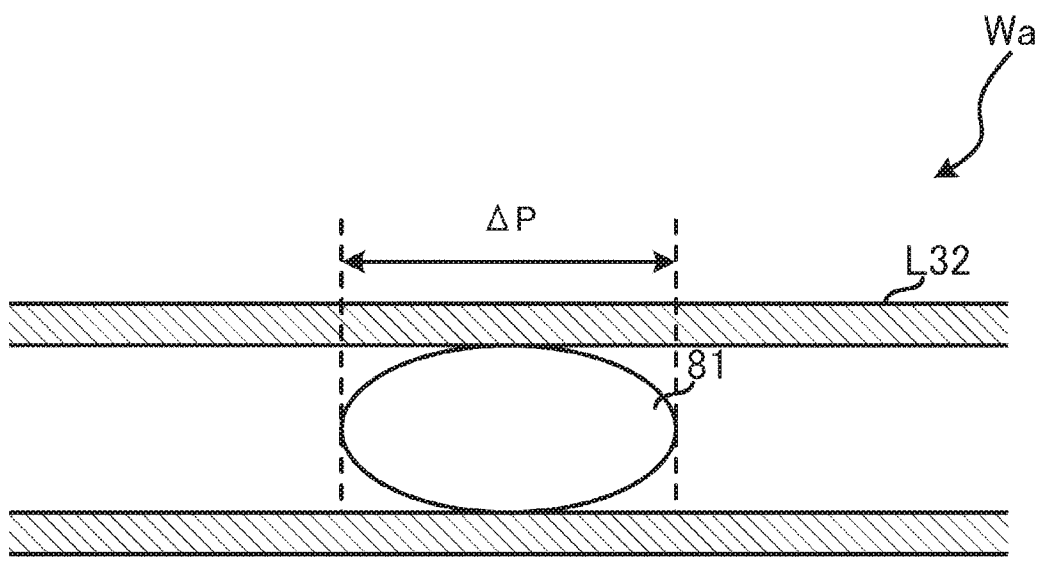
FIG. 8A is a sectional view showing an example of discharging liquid water.

FIG. 8A is a sectional view showing an example of discharging the liquid water. As indicated by a reference symbol Wa, when the anode discharge pipe L32 is clogged with the liquid water 81 generated by power generation, the difference ΔP between the pressures of the liquid water 81 on the upstream side and the downstream side can be used to remove the liquid water 81. Thus, the liquid water 81 is removed by the pressure pulsation as described above.

Figure 8B:
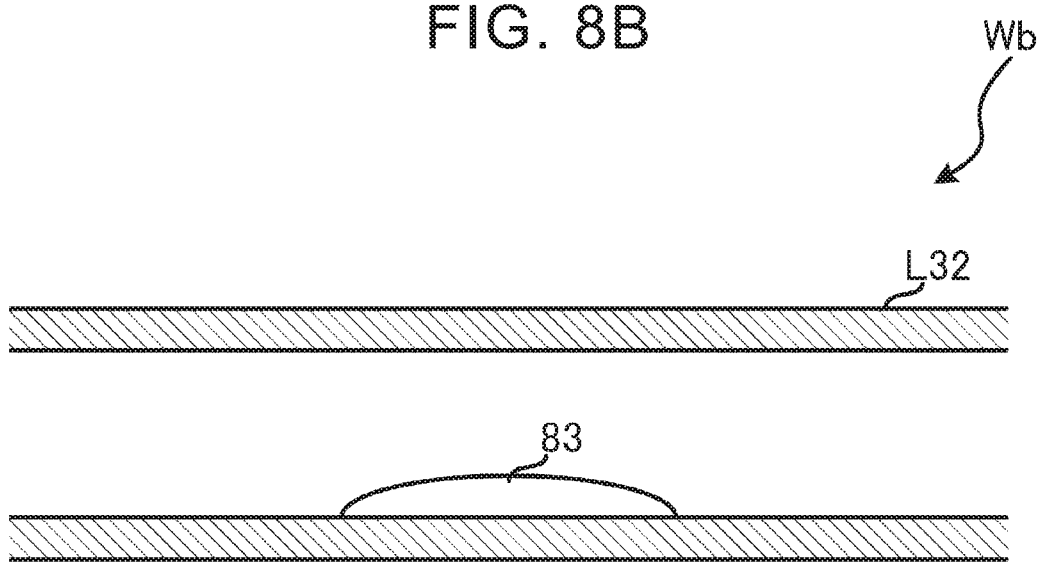
FIG. 8B is a sectional view showing another example of discharging liquid water.

FIG. 8B is a sectional view showing another example of discharging the liquid water. As shown by a reference symbol Wb, when the liquid water 83 generated by power generation is adhered to the inner wall of the anode discharge pipe L32, the liquid water 83 can be removed by the shearing force generated by the flow of the anode off-gas. Thus, the circulation amount of the anode off-gas is maintained as described above, and the liquid water 83 is removed by the pressure pulsation.

Therefore, the fuel cell system can replace the gas supply using the high-circulation ejector 4a with the gas supply using the low-circulation ejector 4b while suppressing excessive gas supply and deterioration of drainage properties.

Referring again to FIG. 4, the ECU 70 opens the anode discharge valve 6 after performing the multiple supplies from the low-circulation INJ 32 at each supply cycle Tf_L. and closes the anode discharge valve 6 when the pressure P becomes equal to or less than the target value PL in the period T1. Thus, the minimum value of the pressure P in the period T2 is maintained at the target value PL in the period T1. Accordingly, the width of the pressure pulsation in the period T2 can be made closer to the width of the pressure pulsation in the period T1, which further enhances the drainage properties.

When the pressure P drops below the target value PL after the supply from the high-circulation INJ 31 in the period T1, the ECU 70 executes the supply from the high-circulation INJ 31 again. Further, when the pressure P drops below the target value PH after the supply from the low-circulation INJ 32 in the period T2, the ECU 70 executes the supply from the low-circulation INJ 32 again.

Specifically, the ECU 70 determines the supply cycles Tf_H and Tf_L and the ON times Ton_H and Ton_L so that the supply is performed as described above. Therefore, the high-circulation INJ 31 and the low-circulation INJ 32 can make the pressure P higher than the target values PL and PH by repeatedly supplying the anode gas.

The target value PH in the period T2 is lower than the maximum value PU of the pressure P during the execution of the supply from the high-circulation INJ 31, that is, in the period T1. In other words, the target value PH in the period T2 is set to be lower than the maximum value PU of the pressure P by the supply of the anode gas from the high-circulation INJ 31 in the period T1. Therefore, the excessive supply of the anode gas is suppressed more effectively.

When the discharge of the anode gas from the high-circulation ejector 4a is in an abnormal state or when the anode discharge valve 6 is closed, the ECU 70 maintains the supply from the low-circulation INJ 32 until the pressure P reaches the target value PH. For example, the ECU 70 executes the supply of the anode gas from the low-circulation INJ 32 during the ON time Ton_p at the detection time Tdet of the abnormality in the discharge of the anode gas from the high-circulation ejector 4a. Further, in the period T2, the ECU 70 supplies the anode gas from the low-circulation INJ 32 during the ON time Ton_q after opening and closing the anode discharge valve 6. Here, the ON times Ton_p and Ton_q are required times for the pressure P to reach the target value PH.

Therefore, the ECU 70 can quickly increase the pressure P to the target value PH, as compared with the case where the supply of the anode gas is executed for a plurality of times until the pressure P reaches the target value PH.

Operation of ECU 70

Next, the operation of the ECU 70 will be described. The ECU 70 is operated by the CPU in the ECU 70 that executes a program stored in, for example, the ROM in the ECU 70.

Figure 9:
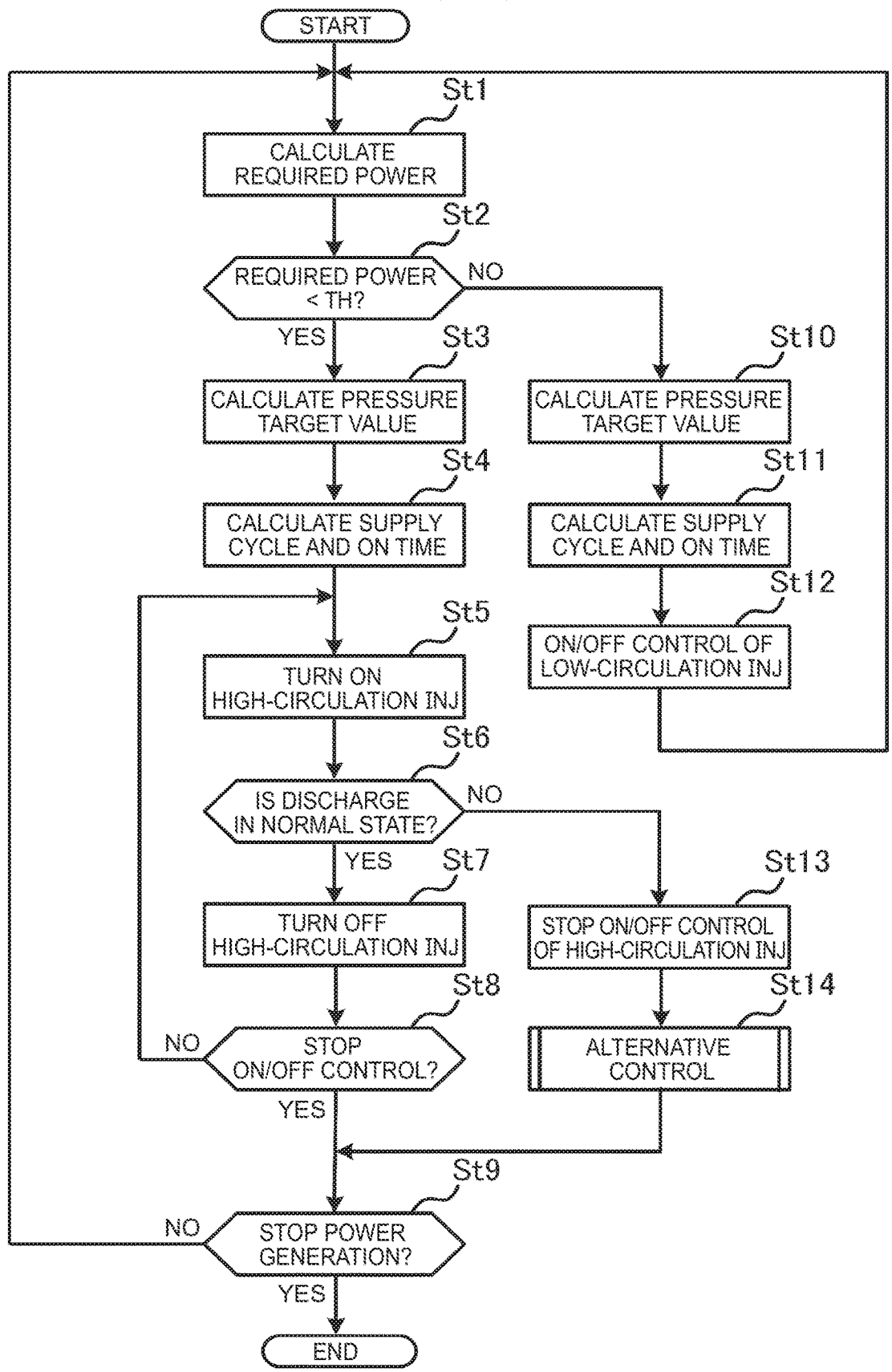
FIG. 9 is a flowchart showing an example of the operation of an electronic control unit (ECU)

FIG. 9 is a flowchart showing an example of the operation of the ECU 70. In this process, it is assumed that the ECU 70 is operating the air compressor 20. The ECU 70 calculates the required power of the FC 1 based on the detection value of the accelerator operation amount sensor 71, for example (step St1).

When the required power is equal to or higher than a predetermined threshold TH (No in step St2), the ECU 70 calculates the target value of the pressure P based on the required power (step St10). Next, the ECU 70 calculates the supply cycle and the ON time for supplying the anode gas from the low-circulation INJ 32 (step St11). Subsequently, the ECU 70 performs the on/off control of the low-circulation INJ 32 based on the supply cycle and the ON time (step St12). Accordingly, when the required power of the FC 1 is high, the anode gas is supplied from the low-circulation INJ 32 to the FC 1 via the low-circulation ejector 4b.

When the required power is lower than the predetermined threshold TH (Yes in step St2), the ECU 70 calculates the target value PL of the pressure P based on the required power (step St3). Next, the ECU 70 calculates the supply cycle Tf_H and the ON time Ton_H for executing the supply of the anode gas from the high-circulation INJ 31 so that the pressure P becomes the target value PL (step St4). The following steps St5 to St8 correspond to the on/off control in the period T1 in FIG. 4.

The ECU 70 turns on the high-circulation INJ 31 during the ON time Ton_H based on the PWM signal VH (step St5). Accordingly, the anode gas is supplied from the high-circulation INJ 31 to the FC 1 via the high-circulation ejector 4a. The pressure P at the inlet increases due to the supply of the anode gas.

Next, the ECU 70 determines whether the discharge of the anode gas from the high-circulation ejector 4a is in a normal state (step St6). This determination is executed at a timing while the high-circulation INJ 31 is ON. The contents of the determination process will be described later.

When the discharge of the anode gas from the high-circulation ejector 4a is in a normal state (Yes in step St6), the ECU 70 turns OFF the high-circulation INJ 31 (step St7). At this time, the ECU 70 turns OFF the high-circulation INJ 31 during the time remaining after subtracting the ON time Ton_H from the supply cycle Tf_H. Accordingly, the on/off control of the high-circulation INJ 31 is executed at each supply cycle Tf_H.

Next, the ECU 70 determines whether to stop the on/off control of the high-circulation INJ 31 (step S8). For example, the ECU 70 determines to stop the on/off control when the supply of the anode gas, that is, the injection of the anode gas, is performed from the high-circulation INJ 31 for a predetermined number of times. When the ECU 70 continues the on/off control (No in step St8), the processes of step St5 and thereafter are executed again.

When stopping the on/off control (Yes in step St8), the ECU 70 determines whether to stop the power generation of the FC 1 (step St9). The ECU 70 stops the power generation when, for example, an ignition switch (not shown) is turned OFF. When the power generation is continued (No in step St9), the processes of step St1 and thereafter are executed again. When the power generation is stopped (Yes in step St9), the ECU 70 ends the operation.

When the discharge of the anode gas from the high-circulation ejector 4a is in an abnormal state (No in step St6), the ECU 70 stops the on/off control of the high-circulation NJ 31 (step St13). Next, the ECU 70 executes the on/off control (alternative control) of the low-circulation INJ 32 in place of the high-circulation INJ 31 (step St14). The alternative control will be described later.

Next, the process of step St9 is executed. The ECU 70 operates in this way.

Figure 10:
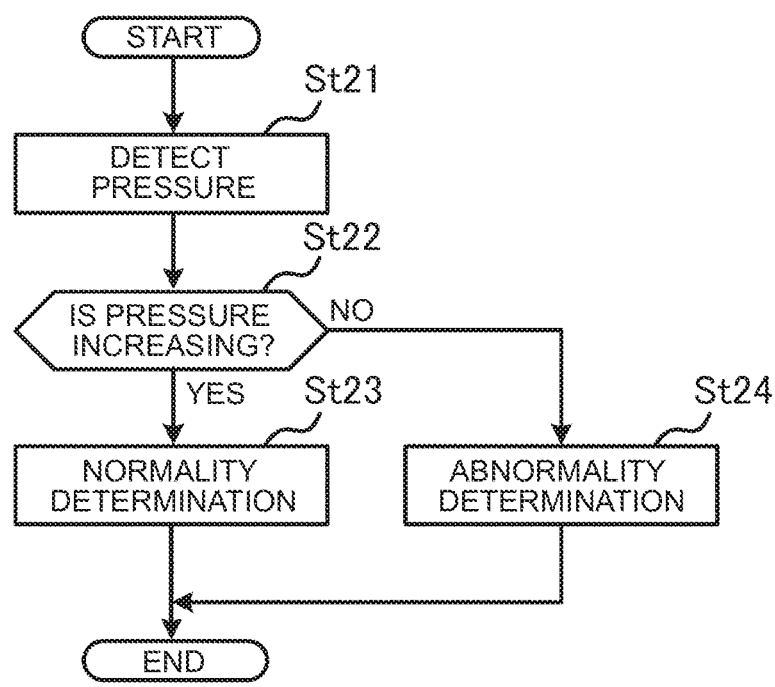
FIG. 10 is a flowchart showing an example of a discharge normality determination process of the high-circulation ejector.

FIG. 10 is a flowchart showing an example of a discharge normality determination process of the high-circulation ejector 4a. This process is executed in step St6 described above.

The ECU 70 detects the pressure P for a plurality of times by the pressure sensor 15 (step St21). Next, the ECU 70 determines from the changes in the pressure P whether the pressure P is increasing (step St22). When the pressure P is increasing (Yes in step St22), the ECU 70 determines that the discharge of the high-circulation ejector 4a is in a normal state (step St23).

When the pressure P does not change or is decreasing (No in step St22), the ECU 70 determines that the discharge from the high-circulation ejector 4a is in an abnormal state (step St24). In other words, the ECU 70 determines that the anode gas is not normally discharged from the high-circulation ejector 4a when the pressure P at the inlet 11 of the FC 1 does not increase even when the supply of the anode gas from the high-circulation INJ 31 is being executed.

As described above, when the supply from the high-circulation INJ 31 is being executed, the ECU 70 determines whether the discharge of the anode gas from the high-circulation ejector 4a is in an abnormal state based on the pressure P measured by the pressure sensor 15. Therefore, the ECU 70 can easily determine whether the discharge of the anode gas is in an abnormal state.

Figure 11:
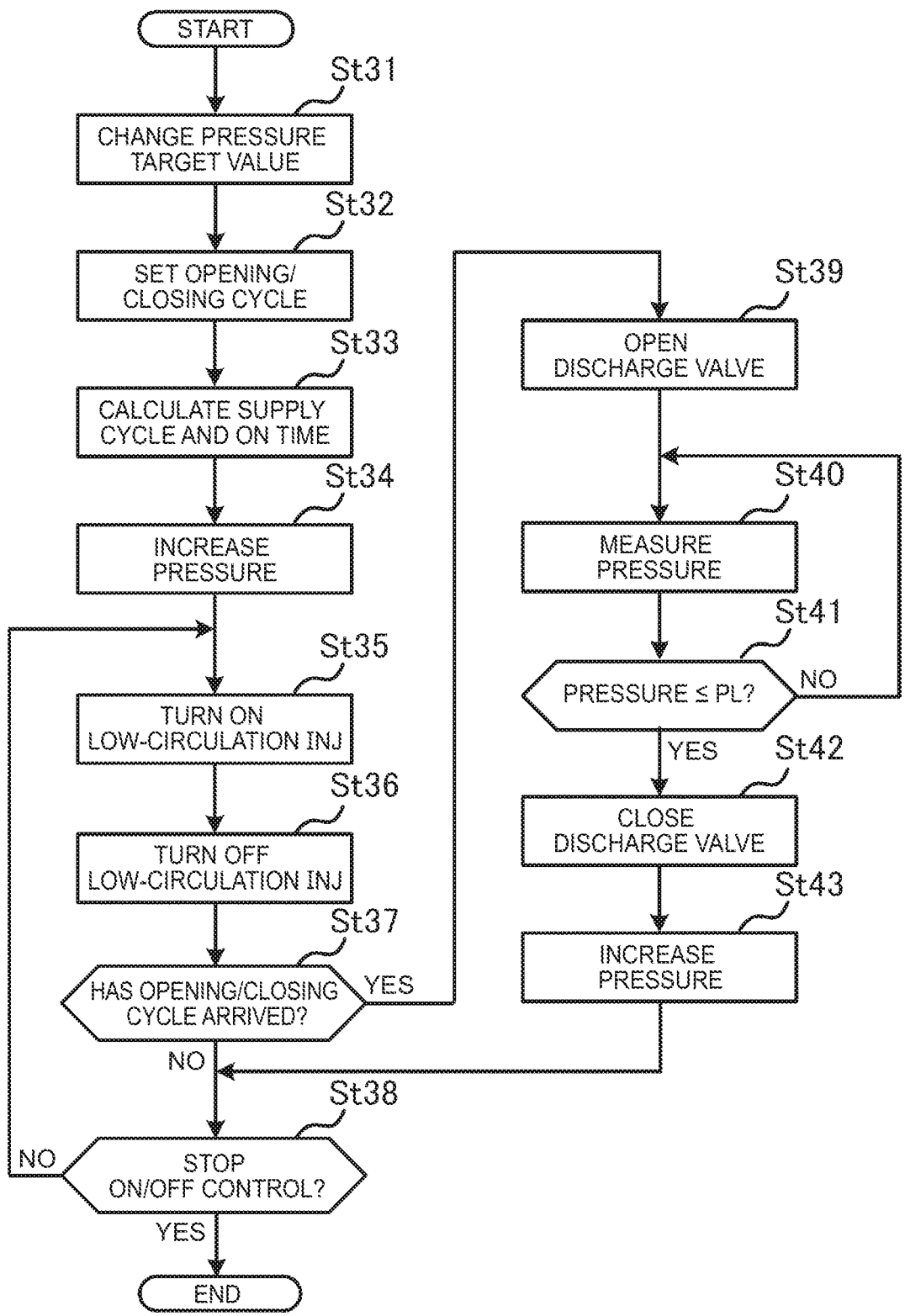
FIG. 11 is a flowchart showing an example of the on/off control of the low-circulation injector in place of the high-circulation injector.

FIG. 11 is a flowchart showing an example of the on/off control of the low-circulation INJ 32 used in place of the high-circulation INJ 31. This process is executed in step St14 described above.

The ECU 70 changes the target value of the pressure P from PL to PH (step St31). Next, the ECU 70 sets the opening/closing cycle of the anode discharge valve 6 to the supply cycle Tf_H in the period T1 (step St32). Subsequently, the ECU 70 calculates the supply cycle Tf_L and the ON time Ton_L for performing the supply of the anode gas from the high-circulation INJ 31 so that the pressure P becomes the target value PH in the state after the change (step St33).

Next, the ECU 70 increases the pressure P to the target value PH by supplying the anode gas from the low-circulation ejector 4b during the ON time Ton_p (step St34). Subsequently, the ECU 70 turns ON the low-circulation INJ 32 during the ON time Ton_L based on the PWM signal VL (step St35). Accordingly, the anode gas is supplied from the low-circulation INJ 32 to the FC 1 via the low-circulation ejector 4b. The pressure P at the inlet increases due to the supply of the anode gas.

Next, the ECU 70 turns OFF the low-circulation INJ 32 (step St36). At this time, the ECU 70 turns OFF the low-circulation INJ 32 during the time remaining after subtracting the ON time Ton_L from the supply cycle Tf_L. Accordingly, the on/off control of the low-circulation INJ 32 is executed at each supply cycle Tf_L.

Next, the ECU 70 determines whether the opening/closing cycle (=Tf_H) of the anode discharge valve 6 has arrived (step St37). When the opening/closing cycle of the anode discharge valve 6 has not arrived (No in step St37), the ECU 70 determines whether to stop the on/off control (step St38). When the ECU 70 continues the on/off control (No in step St38), the processes of step St35 and thereafter are executed again. When the on/off control is stopped (Yes in step St38), the ECU 70 ends the process.

When the opening/closing cycle of the anode discharge valve 6 has arrived (Yes in step St37), the ECU 70 opens the anode discharge valve 6 (step St39). As a result, the pressure P drops from the target value PH, thereby generating the pressure pulsation. Therefore, the liquid water in the anode gas flow path L31 and the anode discharge pipe L32 is collected in the gas-liquid separator 5, flows from the gas-liquid separator 5 to the cathode discharge pipe L22 via the anode discharge valve 6 and the exhaust drainage pipe L35, and is discharged to the outside. Therefore, the drainage properties are maintained at the same level as those in the period T1 due to the pressure pulsation that cannot be obtained by the on/off control of the low-circulation INJ 32.

Next, the ECU 70 measures the pressure P at the inlet 11 of the anode gas of the FC 1 with the pressure sensor 15 (step St40). Next, the ECU 70 compares the pressure P with the target value PL in the period T1 (step St41). When the pressure P is larger than the target value PL (No in step St41), the ECU 70 executes the process of step St40 again.

When the pressure P is equal to or lower than the target value PL (Yes in step St41), the ECU 70 closes the anode discharge valve 6 (step St42). Thus, the minimum value of the pressure P is suppressed to a value around the target value PL.

Next, the ECU 70 increases the pressure P to the target value PH by supplying the anode gas from the low-circulation ejector 4b during the ON time Ton_q (step St43). Subsequently, the process of step St38 is executed. In this way, the on/off control of the low-circulation INJ 32 is executed.

The embodiment described above is a preferred embodiment of the present disclosure. However, the present disclosure is not limited to this, and various modifications can be made without departing from the scope of the present disclosure.

What is claimed is:

1. A fuel cell system comprising:
   a fuel cell configured to generate electric power using fuel gas;
   a first supply device configured to supply the fuel gas to the fuel cell;
   a second supply device configured to supply the fuel gas to the fuel cell;
   a gas-liquid separator configured to separate liquid water from off gas discharged from the fuel cell and to store the liquid water;
   a discharge valve configured to discharge the liquid water stored in the gas-liquid separator;
   a first ejector configured to suck the off gas from the gas-liquid separator using the fuel gas from the first supply device as a driving fluid and to discharge the off gas toward the fuel cell together with the fuel gas such that the off gas circulates to the fuel cell;
   a second ejector configured to suck the off gas from the gas-liquid separator using the fuel gas from the second supply device as a driving fluid and to discharge the off gas toward the fuel cell together with the fuel gas such that the off gas circulates to the fuel cell;

a measuring device configured to measure a pressure of the fuel gas at an inlet of the fuel cell; and a control device configured to control the first supply device, the second supply device, and the discharge valve, wherein:

a discharge amount of the fuel gas per unit time from the first ejector is smaller than a discharge amount of the fuel gas per unit time from the second ejector;

a circulation amount of the off gas circulating from the first ejector to the fuel cell by supply of a predetermined amount of the fuel gas is larger than a circulation amount of the off gas circulating from the second ejector to the fuel cell by the supply of the predetermined amount of the fuel gas; and the control device is configured to control a first cycle at which the first supply device supplies and stops the fuel gas, control a second cycle at which the second supply device supplies and stops the fuel gas, execute the supply of the fuel gas during a first time from the first supply device at each occurrence of the first cycle such that the pressure measured by the measuring device becomes a first target value, and when a discharge of the fuel gas from the first ejector is in an abnormal state, stop the supply of the fuel gas from the first supply device, execute the supply of the fuel gas during a second time from the second supply device at each occurrence of the second cycle such that the pressure measured by the measuring device becomes a second target value, and open and close the discharge valve at each occurrence of the first cycle, the second time being shorter than the first time, the second cycle being shorter than the first cycle, and the second target value being higher than the first target value.

2. The fuel cell system according to claim 1, wherein the second cycle is shorter than a period of time during which a circulation flow of the off gas generated by the supply of the fuel gas from the second supply device is continued.

3. The fuel cell system according to claim 1, wherein the control device is configured to open the discharge valve after executing the supply of the fuel gas from the second supply device a plurality of times during each occurrence of the second cycle, and to close the discharge valve when the pressure measured by the measuring device becomes equal to or lower than the first target value.

4. The fuel cell system according to claim 1, wherein the control device is configured to:

after the supply of the fuel gas is executed from the first supply device and when the pressure measured by the measuring device drops below the first target value, execute the supply of the fuel gas from the first supply device again; and after the supply of the fuel gas is executed from the second supply device and when the pressure measured by the measuring device drops below the second target value, execute the supply of the fuel gas from the second supply device again.

5. The fuel cell system according to claim 4, wherein the second target value is lower than a maximum value of the pressure measured by the measuring device when the supply of the fuel gas from the first supply device is executed.

6. The fuel cell system according to claim 1, wherein the control device is configured to maintain the supply of the fuel gas from the second supply device until the pressure measured by the measuring device reaches the second target value when the discharge of the fuel gas from the first ejector is in the abnormal state or when the discharge valve is closed.

7. The fuel cell system according to claim 1, wherein the control device is configured to determine whether the discharge of the fuel gas from the first ejector is in the abnormal state based on the pressure measured by the measuring device when the supply of the fuel gas from the first supply device is being executed.

\* \* \* \* \*